US009966088B2

(12) United States Patent
Mysore et al.

(10) Patent No.: US 9,966,088 B2
(45) Date of Patent: May 8, 2018

(54) ONLINE SOURCE SEPARATION

(75) Inventors: Gautham J. Mysore, San Francisco, CA (US); Paris Smaragdis, Urbana, IL (US); Zhiyao Duan, Chicago, IL (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1767 days.

(21) Appl. No.: 13/335,688

(22) Filed: Dec. 22, 2011

(65) Prior Publication Data

US 2013/0121506 A1 May 16, 2013

Related U.S. Application Data

(60) Provisional application No. 61/538,664, filed on Sep. 23, 2011.

(51) Int. Cl.
*H04B 15/00* (2006.01)
*G10L 21/028* (2013.01)

(52) U.S. Cl.
CPC .................................. *G10L 21/028* (2013.01)

(58) Field of Classification Search
CPC ............... G10L 21/0272; G10L 21/028; G10L 21/0308; G10L 2021/02165; G10L 15/142; G10L 15/14; G10L 15/144
USPC ........ 381/94.2, 94.1, 94.3, 66; 702/190, 191
See application file for complete search history.

(56) References Cited

U.S. PATENT DOCUMENTS 5,999,956 A 12/1999 Deville
6,898,612 B1 5/2005 Parra et al.
7,010,483 B2 * 3/2006 Rajan ............................ 704/228
7,603,401 B2 10/2009 Parra et al.
7,706,478 B2 4/2010 Moran
7,917,336 B2 3/2011 Parra et al.
8,139,788 B2 * 3/2012 Hiroe et al. ................. 381/94.7
8,380,331 B1 * 2/2013 Smaragdis et al. ............. 700/94
2003/0103561 A1 6/2003 Rickard et al.
2005/0052285 A1 * 3/2005 Iriyama ......................... 340/692
2005/0069162 A1 * 3/2005 Haykin et al. ................ 381/312
2005/0213777 A1 * 9/2005 Zador et al. ................. 381/94.1
2006/0204019 A1 * 9/2006 Suzuki et al. .................. 381/92
2007/0154033 A1 * 7/2007 Attias .......................... 381/94.1
2008/0010038 A1 * 1/2008 Smaragdis et al. ........... 702/181
2008/0228470 A1 * 9/2008 Hiroe ........................... 704/200
2009/0018828 A1 * 1/2009 Nakadai et al. .............. 704/234
2009/0060207 A1 * 3/2009 Barry et al. .................... 381/17
2009/0164212 A1 * 6/2009 Chan et al. ................... 704/226
2009/0306973 A1 * 12/2009 Hiekata et al. ............... 704/205
2009/0310444 A1 * 12/2009 Hiroe ........................... 367/125
2010/0138010 A1 6/2010 Aziz Sbai et al.
(Continued)

OTHER PUBLICATIONS

Smaragdis, P.; "Blind separation of convolved mixtures in the frequency domain"; Neurocomputing; vol. 22; pp. 21-34; 1998.
(Continued)

*Primary Examiner* — Xu Mei
(74) *Attorney, Agent, or Firm* — Wolfe-SBMC

(57) ABSTRACT

Online source separation may include receiving a sound mixture that includes first audio data from a first source and second audio data from a second source. Online source separation may further include receiving pre-computed reference data corresponding to the first source. Online source separation may also include performing online separation of the second audio data from the first audio data based on the pre-computed reference data.

20 Claims, 15 Drawing Sheets

(56) References Cited

U.S. PATENT DOCUMENTS

| | | | | |
|---|---|---|---|---|
| 2011/0026736 | A1* | 2/2011 | Lee et al. | 381/94.7 |
| 2011/0064242 | A1* | 3/2011 | Parikh et al. | 381/94.2 |
| 2011/0078224 | A1* | 3/2011 | Wilson et al. | 708/401 |
| 2011/0123046 | A1* | 5/2011 | Hiroe | 381/98 |
| 2011/0293103 | A1* | 12/2011 | Park et al. | 381/57 |
| 2012/0095753 | A1* | 4/2012 | Nakajima et al. | 704/200 |
| 2012/0158367 | A1* | 6/2012 | Chen et al. | 702/196 |
| 2012/0275271 | A1* | 11/2012 | Claussen et al. | 367/118 |
| 2013/0121511 | A1* | 5/2013 | Smaragdis et al. | 381/119 |
| 2013/0132082 | A1* | 5/2013 | Smaragdis | 704/240 |
| 2013/0132085 | A1* | 5/2013 | Mysore et al. | 704/256.1 |

OTHER PUBLICATIONS

H. Sawada, S. Araki, R. Mukai, S. Makino; "Grouping Separated Frequency Components by Estimating Propagation Model Parameters in Frequency-Domain Blind Source Separation"; IEEE Transactions on Audio, Speech, and Language Processing; vol. 15, No. 5, pp. 1592-1604; 2007.

Yilmaz, O., and S. Rickard; "Blind Separation of Speech Mixtures via Time-Frequency Masking," in IEEE Trans. on Signal Processing, vol. 52, No. 7, 2004, pp. 1830-1847.

Roweis, S.T.; "Factorial Models and Refiltering for Speech Separation and Denoising," Speech Communication and Technology European Conference on Eurospeech (2003); vol. 7, pp. 1009-1012; Geneva, Switzerland.

Tuomas Virtanen; Annamaria Mesaros; Matti Ryynanen; "Combining Pitch-Based Inference and Non-Negative Spectrogram Factorization in Separating Vocals from Polyphonic Music" Statistical and Perceptual Audition; Interspeech 2008; Brisbane, Australia; 6 pages.

Paris Smaragdis; Bhiksha Raj; Madhusudana Shashanka; "Supervised and Semi-Supervised Separation of Sounds from Single Channel Mixtures"; Proceedings of the 7th International Conference on Independent Component Analysis and Signal Separation; London, UK; 2007; 8 pages.

Casey, Michael A.; "Separation of Mixed Audio Sources by Independent Subspace Analysis"; Proceedings of the International Computer Music Conference; 10 pages; Sep. 2001; Copyright Mitsubishi Electric Information Technology Center America, 2001.

Roweis, Sam T.; "One Microphone Source Separation"; Advances in Neural Information Processing Systems; 2001; 7 pages.

Ephraim, Y., et al.; "Speech Enhancement Using a Minimum Mean-Square Error Log-Spectral Amplitude Estimator"; IEEE Transactions on Acoustics, Speech and Signal Processing; vol. 33, Issue 2; pp. 443-445; Apr. 1985.

Sunil D. Kamath and Philipos C. Loizou; "A multi-band spectral subtraction method for enhancing speech corrupted by colored noise"; 2002 IEEE International Conference on Acoustics, Speech, and Signal Processing (ICASSP); May 13-17, 2002; pp. IV-4164-IV-4164; Orlando, Florida.

Pascal Scalart and Jozue Vieira Filho; "Speech enhancement based on a priori signal to noise estimation"; Conference Proceedings of 1996 IEEE International Conference on Acoustics, Speech, and Signal Processing; vol. 2; pp. 629-632; May 7-10, 1996; Atlanta, GA.

Mairal, J.; Bach, F.; Ponce, J.; Sapiro, G.; "Online Learning for Matrix Factorization and Sparse Coding"; Journal of Machine Learning Research; vol. 11; 2010; pp. 19-60.

Fei Wang, et al.; "Efficient Document Clustering via Online Nonnegative Matrix Factorizations"; 12 pages; Proceedings of the Eleventh SIAM International Conference on Data Mining (SDM) 2011; Apr. 28-30, 2011 Mesa, Arizona, USA.

Augustin Lefèvre, Francis Bach, Cédric Févotte; "Online algorithms for Nonnegative Matrix Factorization with the Itakura-Saito divergence"; IEEE Workshop on Applications of Signal Processing to Audio and Acoustics (WASPAA); 2011; 9 pages.

Emmanuel Vincent, Remi Gribonval, Cedric Fevotte; "Performance Measurement in Blind Audio Source Separation"; IEEE Transactions on Audio, Speech, and Language Processing; vol. 14, Issue 4; Jul. 2006; pp. 1462-1469.

Paris Smaragdis, Gautham J. Mysore; "Separation by "Humming": User-Guided Sound Extraction from Monophonic Mixtures"; IEEE Workshop on Applications of Signal Processing to Audio and Acoustics (WASPAA); Oct. 18-21, 2009; pp. 69-72.

Paris Smaragdis; "User Guided Audio Selection from Complex Sound Mixtures"; Proceedings of the 22nd Annual ACM Symposium on User Interface Software and Technology; ACM; New York, NY, USA © 2009; 4 pages.

* cited by examiner

Algorithm 1 Single Frame Dictionary Learning

Require: $\mathcal{B}$ (buffer frames set), $V_{fs}$ for $s \in \mathcal{B} \bigcup \{t\}$ (normalized magnitude spectra of buffer frames and current frame), $P(f|z)$ for $z \in \mathcal{S}_1$ ($\mathcal{S}_1$'s dictionary), $P(f|z)$ for $z \in \mathcal{S}_2$ (initialization of $\mathcal{S}_2$'s dictionary), $P_s(z)$ for $s \in \mathcal{B} \bigcup \{t\}$ and $z \in \mathcal{S}_1 \bigcup \mathcal{S}_2$ (input activation weights of buffer frames and current frame), $\alpha$ (tradeoff between reconstruction of buffer frames and current frame), $M$ (number of EM iterations).

```
for i = 1 to M do
    E Step:
```

$$P_s(z|f) \leftarrow \frac{P_s(z)P(f|z)}{\sum_{z \in \mathcal{S}_1 \bigcup \mathcal{S}_2} P_s(z)P(f|z)}, \text{ for } s \in \mathcal{B} \bigcup \{t\}. \tag{4}$$

```
    M Step:
```

$$\phi(f|z) \leftarrow V_{ft}P_t(z|f) + \frac{\alpha}{|\mathcal{B}|}\sum_{s \in \mathcal{B}} V_{fs}P_s(z|f), \text{ for } z \in \mathcal{S}_2, \tag{5}$$

$$\phi_t(z) \leftarrow \sum_f V_{ft}P_t(z|f), \text{ for } z \in \mathcal{S}_1 \bigcup \mathcal{S}_2. \tag{6}$$

Normalize $\phi(f|z)$ and $\phi_t(z)$ to get $P(f|z)$ and $P_t(z)$ respectively.

end for return learned dictionary $P(f|z)$ for $z \in \mathcal{S}_2$ and activation weights $P_t(z)$ for $z \in \mathcal{S}_1 \bigcup \mathcal{S}_2$ of the current frame $t$.

Algorithm 2 Online Semi-supervised Source Separation

Require: $V_{ft}$ for $t = 1, \cdots, T$ (magnitude spectra of the mixture signal), $P(f|z)$ for $z \in \mathcal{S}_1$ ($\mathcal{S}_1$'s dictionary), $P^{(0)}(f|z)$ for $z \in \mathcal{S}_2$ (random initialization of $\mathcal{S}_2$'s dictionary), $\theta_{KL}$ (threshold to classify a mixture frame), $\mathcal{B}$ (buffer frames set).

for $t = 1$ to $T$ do

Decompose normalized magnitude spectrum $P_t(f) = \frac{V_{ft}}{\sum_f V_{ft}}$ by Eq. (7).

if $d_{KL}(P_t(f) \| \sum_{z \in \mathcal{S}_1} P(f|z)P_t(z)) < \theta_{KL}$ then

Supervised separation using $P(f|z)$ for $z \in \mathcal{S}_1$ and $P^{(t-1)}(f|z)$ for $z \in \mathcal{S}_2$ and $P^{(t)}(f|z) \leftarrow P^{(t-1)}(f|z)$.

else

Learn $\mathcal{S}_2$'s dictionary $P^{(t)}(f|z)$ for $z \in \mathcal{S}_2$ and activation weights $P_t(z)$ using Algorithm 1, with $P^{(t)}(f|z)$ for $z \in \mathcal{S}_2$ initialized as $P^{(t-1)}(f|z)$.

Set $\mathcal{S}_2$'s magnitude spectrum as:

$$V_{ft}\frac{\sum_{z \in \mathcal{S}_2} P^{(t)}(f|z)P_t(z)}{\sum_{z \in \mathcal{S}_1} P(f|z)P_t(z) + \sum_{z \in \mathcal{S}_2} P^{(t)}(f|z)P_t(z)}. \tag{8}$$

Replace the oldest frame in $\mathcal{B}$ with the $t$-th frame.

end if end for return separated magnitude spectra of the current frame.

FIG. 4

ONLINE SOURCE SEPARATION

PRIORITY INFORMATION

This application claims benefit of priority of U.S. Provisional Application Ser. No. 61/538,664 entitled "Online Source Separation" filed Sep. 23, 2011, the content of which is incorporated by reference herein in its entirety.

BACKGROUND

In teleconferencing or audio/video chatting, background noise is an unwanted signal that is transmitted together with the wanted speech signal. Typical speech denoising or speech enhancement techniques model the noise signal with a single spectral profile that is estimated from several clean noise signal frames beforehand. When the background noise is non-stationary (e.g., having a noise spectrum that changes significantly and rapidly over time, such as keyboard noise, sirens, eating chips, baby crying, etc.), however, as is often the case, such techniques perform poorly as the noise characteristic cannot be modeled well by a single spectrum.

SUMMARY

This disclosure describes techniques and structures for online source separation. In one embodiment, a sound mixture may be received. The sound mixture may include first audio data from a first source and second audio data from a second source. Pre-computed reference data corresponding to the first source may be received. Online separation of the second audio data from the first audio data may be performed based on the pre-computed reference data.

In one non-limiting embodiment, online separation may be performed in real-time. In some instances, online separation may be performed using online PLCA or similar algorithms. Performing online separation may include determining if a frame of the sound mixture includes audio data other than the first audio data, such as second audio data, and if so, separating the second audio data from the first audio data for the frame.

BRIEF DESCRIPTION OF THE DRAWINGS

FIG. 4 is an example online PLCA algorithm for source separation according to some embodiments.

Figure 1:
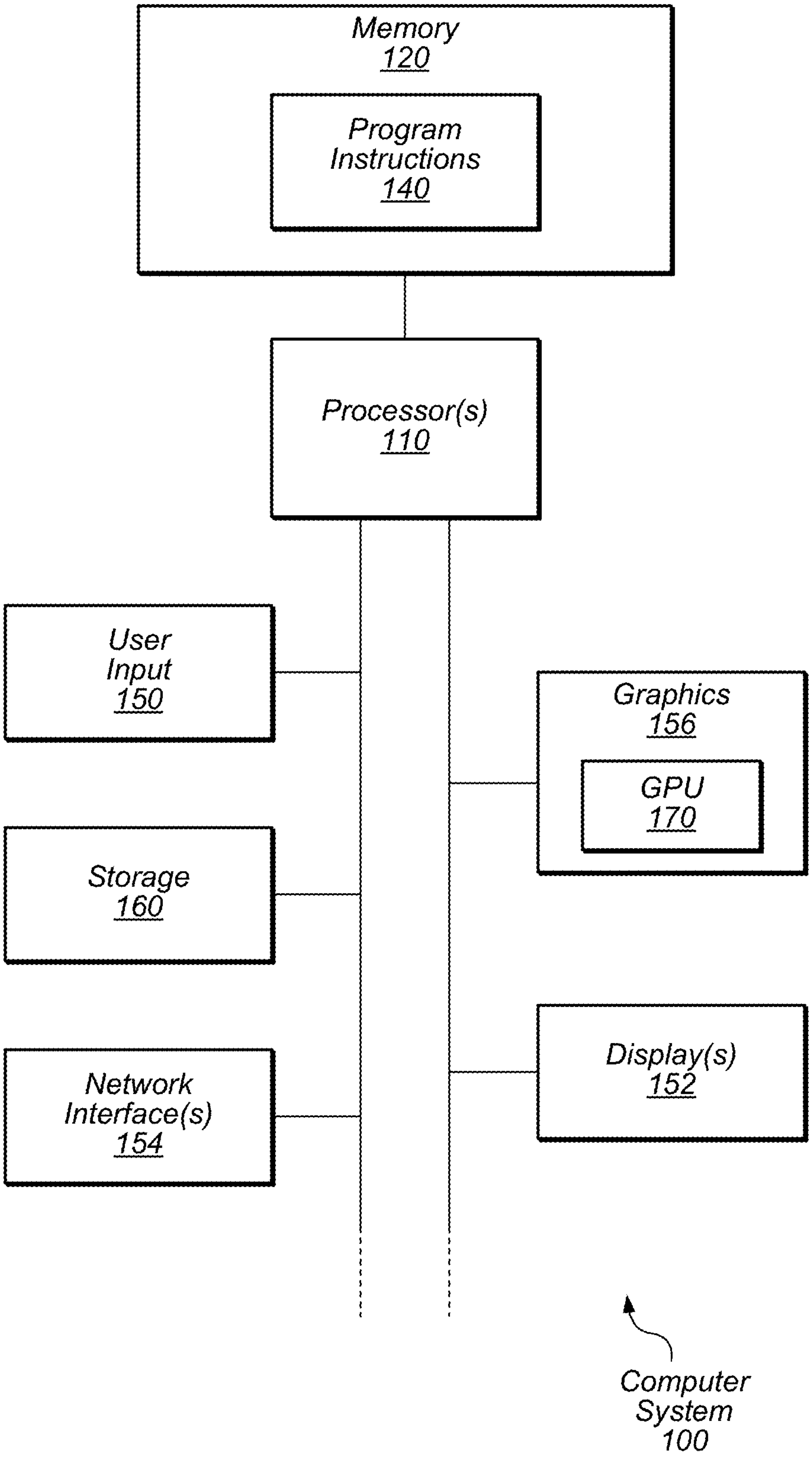
FIG. 1 is a block diagram of an illustrative computer system or device configured to implement some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, the terms "first" and "second" sources can be used to refer to any two of a plurality of sources. In other words, the "first" and "second" sources are not limited to logical sources 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Signal." Throughout the specification, the term "signal" may refer to a physical signal (e.g., an acoustic signal) and/or to a representation of a physical signal (e.g., an electromagnetic signal representing an acoustic signal). In some embodiments, a signal may be recorded in any suitable medium and in any suitable format. For example, a physical signal may be digitized, recorded, and stored in computer memory. The recorded signal may be compressed with commonly used compression algorithms. Typical formats for music or audio files may include WAV, OGG, RIFF, RAW, AU, AAC, MP4, MP3, WMA, RA, etc.

"Source." The term "source" refers to any entity (or type of entity) that may be appropriately modeled as such. For example, a source may be an entity that produces, interacts with, or is otherwise capable of producing or interacting with a signal. In acoustics, for example, a source may be a musical instrument, a person's vocal cords, a machine, etc. In some cases, each source—e.g., a guitar—may be modeled as a plurality of individual sources—e.g., each string of the guitar may be a source. In other cases, entities that are not otherwise capable of producing a signal but instead reflect, refract, or otherwise interact with a signal may be modeled a source—e.g., a wall or enclosure. Moreover, in some cases two different entities of the same type—e.g., two different pianos—may be considered to be the same "source" for modeling purposes. In some instances, a "source" may also refer to a signal coming from any entity or type of entity. Example sources may include noise, speech, music, singing, etc.

"Mixed signal," "Sound mixture." The terms "mixed signal" or "sound mixture" refer to a signal that results from a combination of signals originated from two or more sources into a lesser number of channels. For example, most modern music includes parts played by different musicians with different instruments. Ordinarily, each instrument or part may be recorded in an individual channel. Later, these recording channels are often mixed down to only one (mono) or two (stereo) channels. If each instrument were modeled as a source, then the resulting signal would be considered to be a mixed signal. It should be noted that a mixed signal need not be recorded, but may instead be a "live" signal, for example, from a live musical performance or the like. Moreover, in some cases, even so-called "single sources" may be modeled as producing a "mixed signal" as mixture of sound and noise.

Figure 6A:
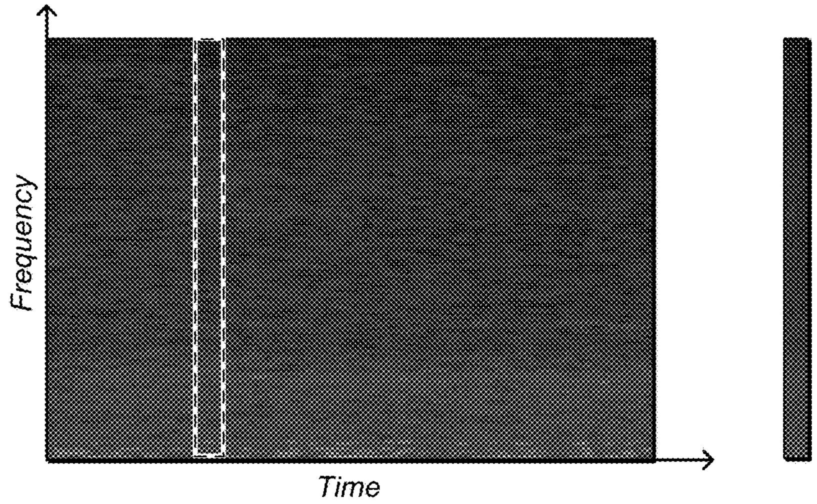
FIGS. 6A-6B illustrate spectral profiles of stationary and non-stationary noise, respectively.
Figure 6B:
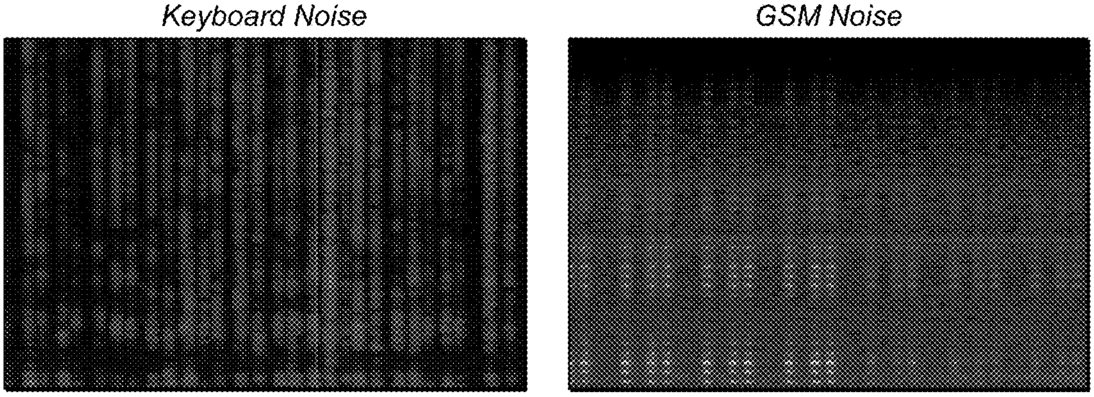

"Stationary noise," "Non-stationary noise." The term "stationary noise" refers to noise having a spectral profile that remains almost the same over time. FIG. 6A illustrates a spectral profile of example stationary noise. "Non-stationary noise" refers to noise having a spectral profile that may change rapidly and significantly over time. FIG. 6B illustrates spectral profiles for example non-stationary noise, keyboard noise and GSM noise.

Introduction

This specification first presents an illustrative computer system or device, as well as an illustrative online source separation module that may implement certain embodiments of methods disclosed herein. The specification then discloses techniques for online source separation. Various examples and applications are also disclosed. Some of these techniques may be implemented, for example, by an online source separation module or computer system.

In some embodiments, these techniques may be used in denoising speech, speech enhancement, music recording and processing, source separation and extraction, noise reduction, teaching, automatic transcription, electronic games, audio and/or video organization, and many other applications. As one non-limiting example, the techniques may allow for speech to be denoised from noisy speech having a non-stationary noise profile. Although certain embodiments and applications discussed herein are in the field of audio, it should be noted that the same or similar principles may also be applied in other fields.

Example System

FIG. 1 is a block diagram showing elements of an illustrative computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In some embodiments, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In an embodiment, one or more display devices 152 may be coupled to the graphics component 156 for display of data provided by the graphics component 156.

In some embodiments, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Online Source Separation Module

Figure 2:
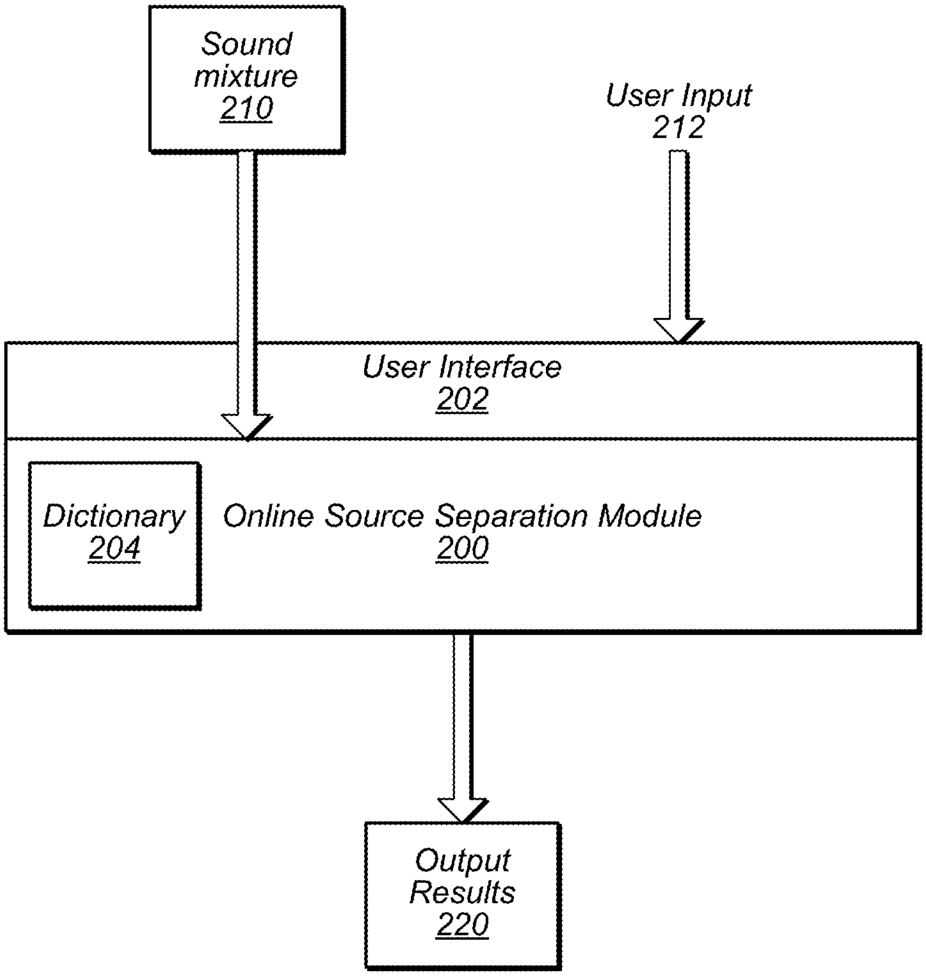
FIG. 2 is a block diagram of an online source separation module according to some embodiments.

In some embodiments, an online source separation module may be implemented by processor-executable instructions (e.g., instructions 140) stored on a medium such as memory 120 and/or storage device 160. FIG. 2 shows an illustrative online source separation module that may implement certain embodiments disclosed herein. In some embodiments, module 200 may provide a user interface 202 that includes one or more user interface elements via which a user may initiate, interact with, direct, and/or control the method performed by module 200. Module 200 may be operable to obtain signal data (e.g., digital, analog, etc.) for sound mixture 210 (e.g., a non-stationary noise source combined with a speech source), receive user input 212 regarding the source(s), analyze the signal data and/or the input, and output results 220. In an embodiment, the module may include or have access to additional or auxiliary signal-related information, such as dictionary 204. Dictionary 204 may be computed offline, in advance, in some embodiments. Additional information may alternatively include a collection of representative signals, model parameters, etc. Output results 220 may include one or more of the separated sources of sound mixture 210.

Online source separation module 200 may be implemented as or in a stand-alone application or as a module of or plug-in for a signal processing application. Examples of types of applications in which embodiments of module 200 may be implemented may include, but are not limited to, signal (including sound) analysis, denoising, speech enhancement, source separation, characterization, search, processing, and/or presentation applications, as well as applications in security or defense, educational, scientific, medical, publishing, broadcasting, entertainment, media, imaging, acoustic, oil and gas exploration, and/or other applications in which signal analysis, characterization, representation, or presentation may be performed. Module 200 may also be used to display, manipulate, modify, classify, and/or store signals, for example to a memory medium such as a storage device or storage medium.

Figure 3:
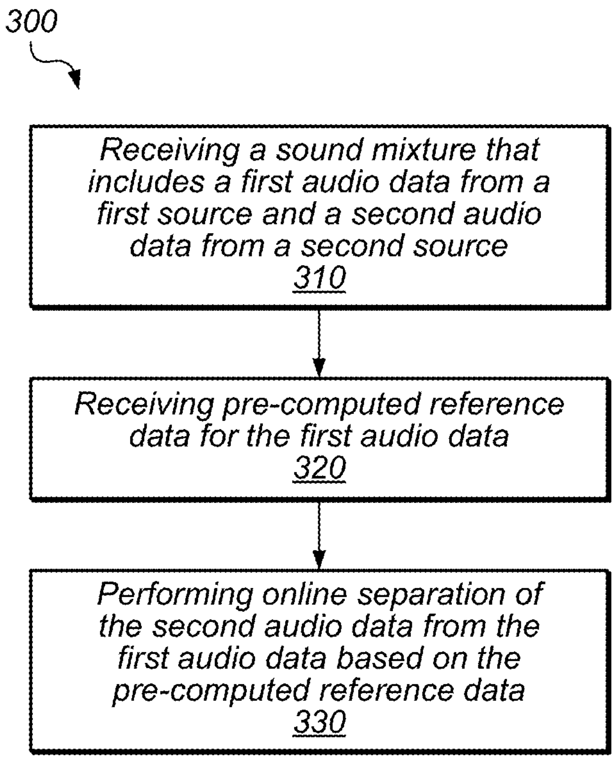
FIG. 3 is a flowchart of a method for online source separation according to some embodiments.

Turning now to FIG. 3, one embodiment of online source separation is illustrated. While the blocks are shown in a particular order for ease of understanding, other orders may be used. In some embodiments, method 300 of FIG. 3 may include additional (or fewer) blocks than shown. Blocks 310-330 may be performed automatically, may receive user input, or may use a combination thereof. In some embodiments, one or more of blocks 310-330 may be performed by online source separation module 200 of FIG. 2.

As illustrated at 310, a sound mixture that includes first audio data from a first source and a second audio data from a second source may be received. Example classes of sound sources may include: speech, noise (e.g., non-stationary noise such as sirens, keyboard typing, GSM, a baby crying, eating chips, etc.), music, etc. Accordingly, examples of sound mixtures may be signals that include: speech and non-stationary noise, speech, singing, and music, etc. The received sound mixture may be in the form of a spectrogram of signals emitted by the respective sources corresponding to each of a plurality of sound sources (e.g., first source, second source, etc.). In other scenarios, a time-domain signal may be received and processed to produce a time-frequency representation or spectrogram. In some embodiments, the spectrograms may be magnitudes of the short time Fourier transform (STFT) of the signals. The signals may be previously recorded or may be portions of live signals received at online source separation module 200. Whether live or recorded, the signals may be processed by online source separation module 200 in real-time as the signal is received without having to wait for the entire signal to be received. Note that not all sound sources of the received sound mixture may be present at one time (e.g., at one frame). For example, at one point in time of the sound mixture, speech and non-stationary noise may be present while, at another point in time, only non-stationary noise may be present.

As shown at 320, pre-computed reference data may be received that corresponds to the first source. For example, in one embodiment, pre-computed reference data may be received for audio data corresponding to a non-stationary noise source. The pre-computed reference data may be a dictionary of basis spectrums (e.g., plurality of spectral basis vectors). Accordingly, time-varying spectral profiles of the source can be modeled by time-varying convex combinations of the basis spectrums. In one embodiment, pre-computing of the dictionary may be performed by online source separation module 200 while in other embodiments, the pre-computed dictionary may be provided to online source separation module 200, for instance, as user input 212. The pre-computed reference data may be obtained and/or processed at a different time than blocks 310-330 of method 300.

In one embodiment, the dictionary may be pre-computed with an algorithm, such as Probabilistic Latent Component Analysis (PLCA), non-negative hidden Markov (N-HMM), non-negative factorial hidden Markov (N-FHMM), or a similar algorithm. For additional details on the N-HMM and N-FHMM algorithms, see U.S. patent application Ser. No. 13/031,357, filed Feb. 21, 2011, entitled "Systems and Methods for Non-Negative Hidden Markov Modeling of Signals", which is hereby incorporated by reference.

Each dictionary may include a plurality of spectral components. For example, the dictionary may be size N (e.g., 1, 3, 8, 12, 15, etc.) and include N different spectral shapes in the form of basis vectors. Each segment of the spectrogram may be represented by a convex combination of spectral components of the dictionary. The spectral basis vectors and a set of weights (e.g., value between 0 and 1) may be estimated using a source separation technique. Moreover, in some cases, each source may include multiple dictionaries. The source corresponding to the pre-computed dictionary data may be explained as a convex combination of the basis vectors of the dictionary.

Figure 7:
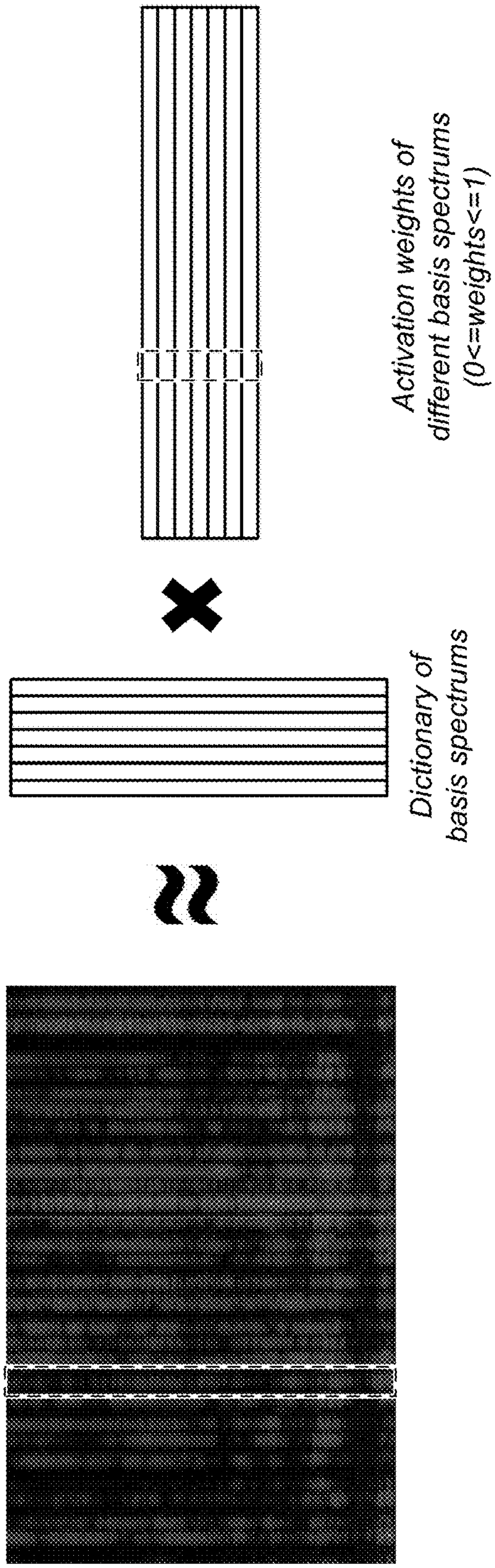
FIG. 7 illustrates an example of modeling noise according to some embodiments.

In one embodiment, the pre-computed dictionary may be computed as follows. A portion of the signal for which the dictionary is computed may be long enough to cover different spectral profiles that the signal may have. Note that the signal, while corresponding to the first source, may not be the same signal containing the first audio data. Instead, in some embodiments, it may be a separate signal that is representative of the first source. The portion of the signal, also referred to as the training excerpt, may be separated into overlapping frames. For instance, in one embodiment, the training excerpt may be separated into 64 ms long frames with a 48 ms overlap. Short Time Fourier Transform (STFT) may be used to calculate the magnitude spectrum of each frame, for which each calculated spectrum may be normalized such that its entries sum to 1. PLCA, or a comparable algorithm, may then be used to factorize the magnitude spectrums:

$$P_t(f) \approx \sum_z P(f \mid z) P_t(z) \tag{1}$$

where $P_t(f)$ is the normalized magnitude spectrum of the time frame t; $P(f|z)$ is an element (basis) of the learned dictionary; and $P_t(z)$ is the activation weight of this basis for frame t. An example noise spectrogram and corresponding dictionary of basis spectrums and activation weights is shown in FIG. 7.

Turning back to block 320 of FIG. 3, generally speaking, PLCA may model data as a multi-dimensional joint probability distribution. Intuitively, the PLCA model may operate on the spectrogram representation of the audio data and may learn an additive set of basis functions that represent all the potential spectral profiles one expects from a sound. PLCA may then enable the hidden, or latent, components of the data to be modeled as the three distributions, $P_t(f)$, $P(f|z)$, and $P_t(z)$. $P(f|z)$ corresponds to the spectral building blocks, or bases, of the signal. $P_t(z)$ corresponds to how a weighted combination of these bases can be combined at every time t to approximate the observed signal. Each dictionary may include one or more latent components, z, which may be interpreted as spectral vectors from the given dictionary. The variable f indicates a frequency or frequency band. The spectral vector z may be defined by the distribution $P(f|z)$. It should be noted that there may be a temporal aspect to the model, as indicated by t. The given magnitude spectrogram at a time frame is modeled as a convex combination of the spectral vectors of the corresponding dictionary. At time t, the weights may be determined by the distribution $P_t(f)$. In an embodiment using PLCA, because everything may be modeled as distributions, all of the components may be implicitly nonnegative. By using nonnegative components, the components may all be additive, which can result in more intuitive models. As described herein, other models may be used. For example, non-probabilistic models, such as non-negative matrix factorization (NMF), N-HMM and N-FHMM may also be used.

The size of the learned dictionary may be the number of summands on the right hand side of Equation (1) and may be denoted by $K_n$. $K_n$ may be specified before source separation occurs at block 330 and its value may be dependent on the type and complexity of the source corresponding to the dictionary. For example, for a very complex noise source, the value of $K_n$ may be larger than for a simple noise source.

The dictionary learning process may be cast as a constrained optimization problem. Accordingly, in one embodiment, the Kullback-Leibler (KL) divergence between the input magnitude spectrum $P_t(f)$ and the reconstructed spectrum $Q_t(f)=\Sigma_z P(f|z)P_t(z)$ of all frames in the training excerpt may be minimized. The constraints $P(f|z)$ and $P_t(z)$ may be probability distributions:

$$\min_{P(f|z), P_t(z)} \sum_{t=1}^{N} d_{KL}(P_t(f) \,\|\, Q_t(f)) \tag{2}$$

$$\text{s.t.} \sum_f P(f \mid z) = 1 \text{ for all } z$$

$$\sum_f P_t(z) = 1 \text{ for all } t \text{ and } z$$

where N is the total number of frames in the training excerpt. The KL divergence may be defined as:

$$d_{KL}(P_t(f) \,\|\, Q_t(f)) = \sum_f P_t(f) \log \frac{P_t(f)}{Q_t(f)}.$$

In various embodiments, the KL divergence may be positive (nonnegative). As a result, $Q_t(f)$ may be an approximation of $P_t(f)$. As the size of the dictionary $K_n$ increases, $Q_t(f)$ may more closely approximate $P_t(f)$.

In some instances, the received sound mixture may include more than two sources. For example, the received sound mixture may include N sources. Pre-computed reference data may be received for N−1 sources or some number of sources greater than one. Consider a scenario in which non-stationary noise, speech, and music are three sources of a sound mixture. In one embodiment, pre-computed reference data may exist for two of the sources (e.g., non-stationary noise and music). In other embodiments, pre-computed reference data may exist for one of the sources (e.g., non-stationary noise) and as described at 330, the remaining two sources may be treated as a single source when separating from the source for which pre-computed reference data exists. In an embodiment in which pre-computed reference data exists for multiple sources, the data for the sources may be received as composite data that includes the data for each of the multiple sources. In one embodiment, reference data may be generated by online source separation module 200, and may include generating a spectrogram for each source. In other embodiments, another component, which may be from a different computer system, may generate the data.

In some embodiments, the pre-computed reference data may be generated with isolated training data for the source. For instance, the isolated training data may include clean non-stationary noise without speech. The isolated training data may not be the same as the first audio data but may approximate the first audio data's spectral profile.

In some embodiments, the reference data may also include parameters such as, mixture weights, initial state probabilities, energy distributions, etc. These parameters may be obtained, for example, using an EM algorithm or some other suitable method.

As shown at 330, the second signal may be separated from the first signal in an online manner based on the pre-computed reference data. An online manner is used herein to mean that the source separation may be performed even without access to an entire recording or sound mixture. The sound mixture could therefore be live, in real-time, or it could be a portion of a recorded performance. The method of FIG. 3 may process frames as they are received, for instance, in real-time applications in which module 200 only has access to current and past data or for very long recordings for which the whole recording may not fit in computer memory. In one embodiment, audio data from the original sound mixture may be separated, or decomposed, into a number of components, based on the pre-computed dictionary. As such, the separation may be semi-supervised separation as clean data may exist for at least one source. For example, in a scenario in which the sound mixture includes speech and non-stationary noise, with the pre-computed reference data corresponding to the non-stationary noise, the speech may be separated from the non-stationary noise in an online manner. The separation may occur at each time frame of the sound mixture in real-time such that future sound mixture data may not be necessary to separate the sources. Thus, an entire recording of the sound mixture may not be required and the sources may be separated as the sound mixture is received at 310.

Figure 8:
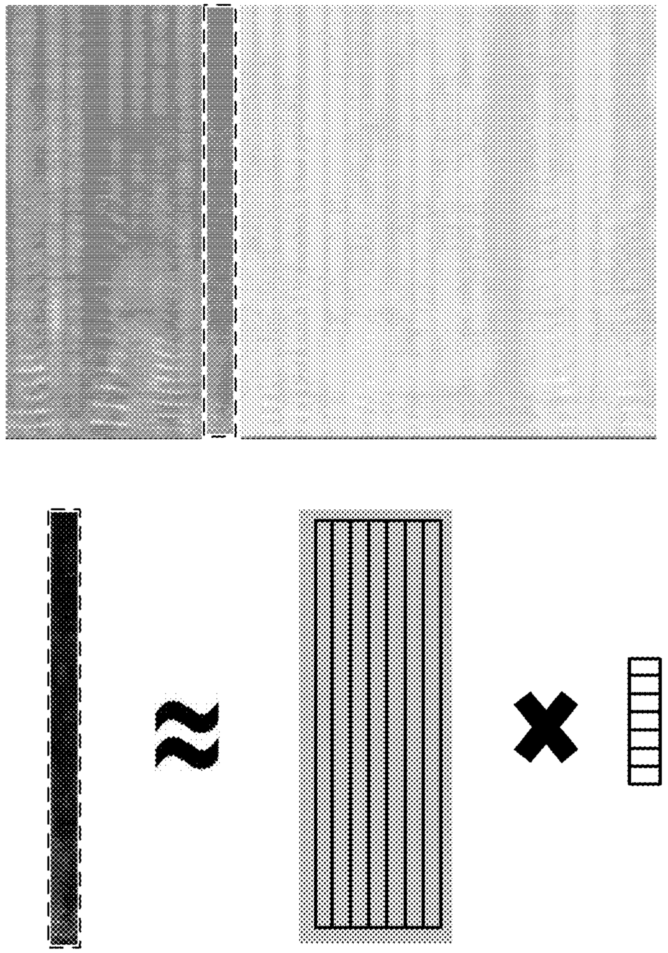
FIGS. 8-10 illustrate examples of online PLCA for denoising according to some embodiments.

FIG. 8 illustrates that the method of FIG. 3 may be performed in an online fashion. The top image is a spectrogram of noisy speech with the boxed area corresponding to the currently processed frame with the faded area to the right of the boxed area representing frames that will be processed in the future but that may not be currently available. The bottom images illustrate the portion of the spectrogram corresponding to the current frame, the noise dictionary, and the noise weights.

Turning back to FIG. 3, in one embodiment, the received sound mixture may be subdivided into frames for processing. For instance, the received sound mixture may be divided into 64 ms long frames with a 48 ms overlap. Magnitude spectrums may then be calculated for each of those frames. For real-time applications, a 64 ms long buffer may be used to store the incoming sound mixture. Once the buffer is full, a time frame may be generated.

In one embodiment, in processing each frame, it may be determined if the frame includes the second source (e.g., speech). Each incoming time frame may be approximated using convex combinations of the bases of the pre-computed dictionary. A dictionary (e.g., spectral basis vectors) for the second source may be maintained and updated as frames are processed, for example, by applying PLCA. PLCA may be used on the buffer along with the sound mixture frame currently being processed. In one embodiment, a convex combination of the pre-computed dictionary bases and the second source's dictionary bases may be computed to approximate the buffer signal. Specifically, in one embodiment, supervised PLCA from Eqs. (1) and (2) may be used to decompose the normalized magnitude spectrum of the current frame, where the pre-computed dictionary P(f|z) is fixed and where the activation weights $P_t(z)$ may be updated. Then, the KL divergence between the input spectrum $P_t(f)$ and the reconstruction $Q_t(f)$ may be calculated. If the KL divergence is less than a threshold $\theta_{KL}$, then it may be determined that the current frame is well explained by the pre-computed reference data and that the frame does not include the second source. In some embodiments, if it is determined that the frame does not include the second source, the frame may not be included in the running buffer as described herein. Nevertheless, in some instances, supervised separation may be performed on that frame using the pre-learned dictionary for the first source and the previously updated dictionary for the second source. In one embodiment, the threshold $\theta_{KL}$ may be learned from the training excerpt. In such an embodiment, the spectrums of the training excerpt may be decomposed using supervised PLCA, where the pre-computed dictionary is fixed (as what was pre-computed) with only the activation weights being updated. The average and standard deviation of the KL divergences of the spectrums may be calculated and the threshold may be set as $\theta_{KL}$=mean+std. If the current frame is classified as not containing the second source, the separated source magnitude spectrum may be set to 0. In the denoising context, if the current noisy speech frame is classified as not containing speech, then the denoised speech magnitude spectrum may be set to 0.

If the KL divergence (e.g., approximation error) is not less than the threshold, then it may be determined that the current frame is not well explained by the pre-computed dictionary and therefore includes the second source. Once the current frame is determined to include the second source, the second audio data may be separated from the first audio data. Specifically, in one embodiment, the magnitude spectrum of the frame may be decomposed into the spectrum for the one source (e.g., noise) and a spectrum for the second source (e.g., speech) using semi-supervised PLCA:

$$P_t(f) = \sum_{z \in S_1} P(f \mid z) P_t(z) \text{ where } P(f \mid z) \text{ for } z \in S_1$$

is fixed as the learned noise basis P(f|z), described herein. $S_1$ represents the source while $S_2$ represents the second source. The dictionary for the second source (e.g., speech dictionary) P(f|z) for $z \in S_2$ and the activation weights of both dictionaries $P_t(z)$ may be learned during this decomposition while the dictionary for the source remains fixed.

After learning these values, the spectrums for the source (e.g., noise spectrum) and second source (e.g., speech spectrum) may be reconstructed by $\Sigma_{z \in S_1} P(f|z)P_t(z)$ and $\Sigma_{z \in S_2} P(f|z)P_t(z)$, respectively. In terms of optimization, this may give:

$$\min_{\substack{P(f|z) \text{ for } z \in S2 \\ P_t(z) \text{ for all } z}} d_{KL}(P_t(f) \,||\, Q_t(f)) \tag{3}$$

$$\text{s.t.} \sum_f P(f \mid z) = 1 \text{ for } z \in S_2$$

$$\sum_f P_t(z) = 1 \text{ for all } z$$

In one embodiment, constraints may be imposed on the second source's learned bases P(f|z) for $z \in S_2$. The second source's bases may be used together with some activation weights to reconstruct several (L) frames of second source signals (e.g., speech signals) other than the current frame. The several L frames (e.g., 60 frames, 1 second worth of frames, etc.) may be stored in a buffer B to store the current and a number of previous sound mixture frames that were determined to include the second source. The buffer B may represent a running buffer of the last L frames that include the second source (e.g., last L frames containing noisy speech). As a result, in terms of further optimization, this may give:

$$\min_{\substack{P(f|z) \text{ for } z \in S2 \\ Pt(z) \text{ for all } z}} d_{KL}(P_t(f) \,||\, Q_t(f)) \tag{4}$$

-continued $$\text{s.t. } \sum_f P(f \mid z) = 1 \text{ for } z \in S_2$$

$$\sum_f P_t(z) = 1 \text{ for all } z$$

$$P_s(f) = \sum_{z \in S_1 \cup S_2} P(f \mid z) P_s(z) \text{ for all } s \in B$$

where the activation weights $P_s(z)$ for all s∈B may be fixed as the values learned when separating (e.g., denoising) frame s. The last constraint in Equation (4) may be a soft constraint, which may be expressed in terms of minimizing the KL divergence:

$$\min_{\substack{P(f|z) \text{ for } z \in S_2 \\ Pt(z) \text{ for all } z}} d_{KL}(P_t(f) \| Q_t(f)) + \frac{\alpha}{L} \sum_{s \in B} d_{KL}(P_s(f) \| Q_s(f)) \tag{5}$$

$$\text{s.t. } \sum_f P(f \mid z) = 1 \text{ for } z \in S_2$$

$$\sum_f P_t(z) = 1 \text{ for all } z$$

where Qt(f) and Qs(f) are reconstructions of the spectrums of frame t and s, respectively. α may be the tradeoff between good reconstruction of the current frame and the constraint of good reconstruction of L past frames. In some embodiments, the Expectation Maximization (EM) algorithm may be used to solve Equation (5). As an example, the EM algorithm may be used to iteratively update the second source's dictionary bases and the convex combination coefficients. When the iteration converges, the separated second source in the current frame may be reconstructed using the second source's dictionary bases and corresponding convex combination coefficients. As a result, in a denoising speech embodiment, the sound mixture may be decomposed into a noise dictionary, a speech dictionary, and activation weight of the noise and speech. In the decomposition, the noise dictionary may be fixed because it may be pre-computed as described herein. The speech dictionary and activation weight of the buffer may be updated as the current frame is processed.

The EM algorithm may be generally used for finding maximum likelihood estimates of parameters in probabilistic models. The EM algorithm is an iterative method that alternates between performing an expectation (E) step, which computes an expectation of the likelihood with respect to the current estimate of the distribution, and maximization (M) step, which computes the parameters that maximize the expected likelihood found on the E step. These parameters may then be used to determine the distribution of the variables in the next E step.

In one embodiment, the EM algorithm may include initializing the dictionary of the second source (e.g., speech dictionary). The second source's dictionary may be initialized randomly, or in some cases, using the previously learned second source's dictionary. For example, if the current time is time t and the dictionary of the second source is to be learned at time t, the dictionary may be initialized using the dictionary of the second source learned at time t−1. Such an initialization may be a warm initialization because of the expected similarly between a dictionary learned at time t−1 and a corresponding dictionary learned at time t. With a warm initialization, the decomposition may converge within a few iterations. In one embodiment, the activation weight of the buffer may be initialized using the previously learned activation weight of the buffer. When the buffer is full, the initialization may be even more accurate.

In one embodiment, the source separation technique may weight various portions of the buffer different so as to include some forgetting factors. For instance, frames further in the past may be weighted less than more recent frames. As a result, the second source's dictionary may be updated so that the dictionary can better explain the current frame.

One embodiment of the EM algorithm in an application that uses online PLCA for speech denoising is shown in FIG. 4 as Algorithm 1. Algorithm 1 is an example algorithm to optimize Equation (5). As shown, Algorithm 1 may be used to learn the dictionary for the second source. Algorithm 2 of FIG. 4 is an example algorithm to perform the disclosed online semi-supervised source separation. As shown, Algorithm 2 uses Algorithm 1 at line 6 of Algorithm 2. In one embodiment, the activation weights of the dictionary corresponding to the second source may have a cold initialization. In some embodiments, the EM algorithm may be initialized resulting in a warm start for the EM loop. This may occur because the dictionary of the second source $P^{(t-1)}(f|z)$ learned in frame t−1 may be a good initialization of $P^{(t)}(f|z)$ in frame t, and because the statistics of the second source's signal may not change much in a successive frame. As a result, the EM loop may converge fast (e.g., M=20)

Figure 9:
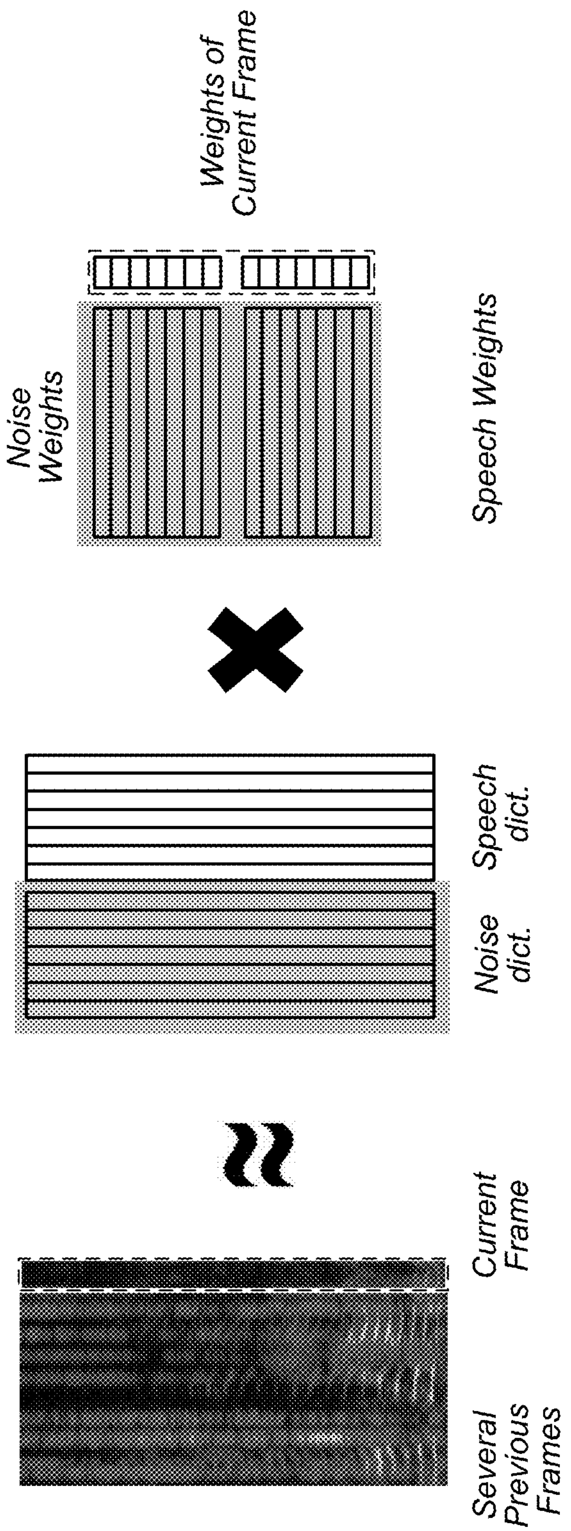
Figure 10:
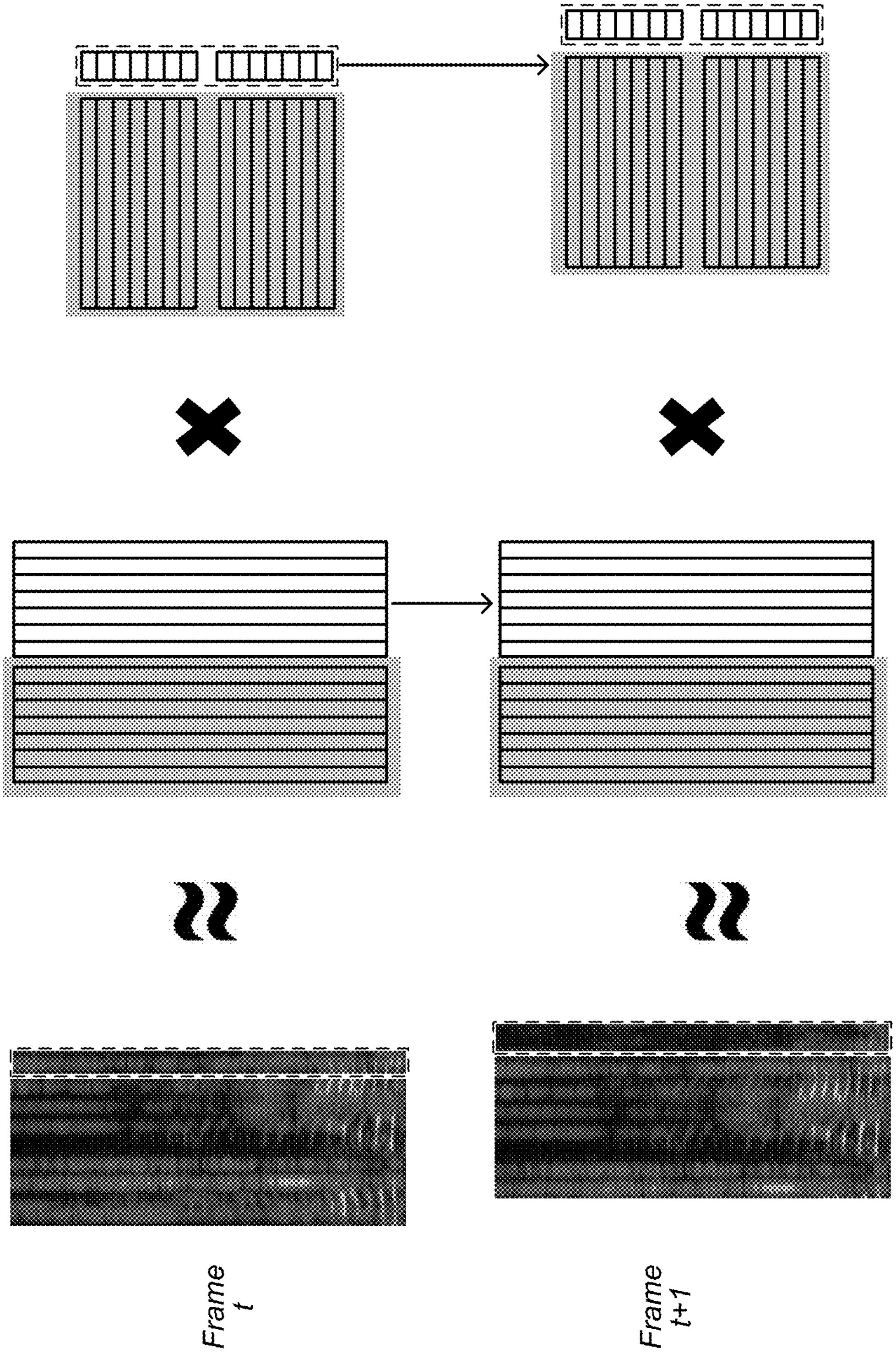

Updating the dictionary of the second source is shown in FIGS. 9-10. FIG. 9 illustrates that weights of the current frame may be added to weights of previous frames that have already been learned. FIG. 10 further illustrates a comparison of the speech dictionary at frames t and t+1. Note that at frame t+1, the size of the speech dictionary may remain the same but with updated values at it includes newer dictionary components while removing older dictionary components.

Turning back to FIG. 3, in one embodiment, the second signal corresponding to the second source may actually include signals from multiple sources. In such an embodiment, the signals of the multiple remaining may be collectively modeled by a single dictionary of basis spectrums. Thus, where multiple sources not having a pre-computed dictionary exist, for example, for an N-source sound mixture in which N−4 sources have pre-computed dictionaries, the second sources, 4 in this example, may be treated as a single source and a dictionary may be computed for a composite source that includes the remaining 4 sources. As a result, the composite source may be separated from the other sources.

Although several of the examples used herein describe the source for which pre-computed reference data is received at 320 as noise with the second source being speech, in other embodiments, pre-computed reference data may be for a speech signal and the second source may be noise or some other signal. In other embodiments, any of the plurality of sources may be speech, noise, or some other signal.

By using the online source separation techniques described herein, a better model for non-stationary noise, a dictionary of basis spectrums, may be achieved that enables improved performance in non-stationary environments. Moreover, in a denoising application, utilizing the online source separation techniques may allow for speech to be modeled using a speech dictionary so that the denoised speech may be more coherent and smooth. Further, because the techniques may be performed online with a smaller and more localized speech dictionary, they can be extended to real-time applications which may result in faster convergence. The described techniques may also allow the learned speech dictionary to avoid overfitting the current frame such that the learned speech dictionary is not simply erroneously equivalent to the noisy frame.

Figure 5:
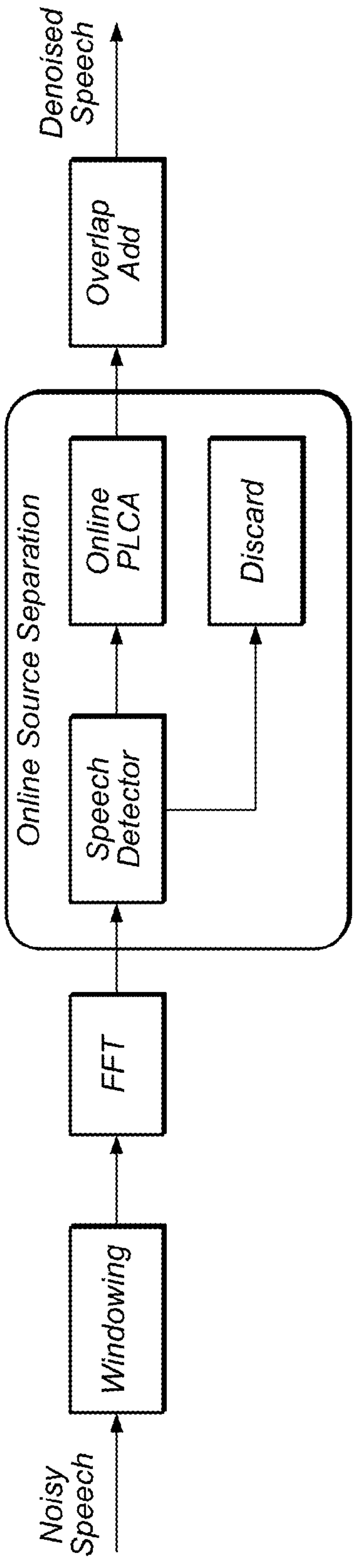
FIG. 5 is a block diagram of an example denoising application according to some embodiments.

FIG. 5 depicts a block diagram of an example application, denoising a noisy speech signal having non-stationary noise, which may utilize the disclosed source separation techniques according to some embodiments. As depicted, the source separation technique may operate on a frame of about 60 ms of noisy speech data as well as a number of previous frames (e.g., 60 frames, 1 second of data, etc.). The previous frames may be frames that were determined to include speech. As described herein, the algorithm may be an online algorithm in that it may not require future data. As shown in FIG. 5, the received noisy speech may be pre-processed by applying windowing and a transform, such as a fast Fourier transform (FFT). The pre-processed noisy speech may then be provided to the online source separation module. Not shown, the online source separation algorithm may already contain the noise dictionary when it receives the pre-processed noisy speech. A speech detector may determine if the current frame being processed includes speech. If it does not, the frame may be discarded. If it does include speech, an algorithm such as online PLCA may be applied resulting in denoised speech.

Figure 11:
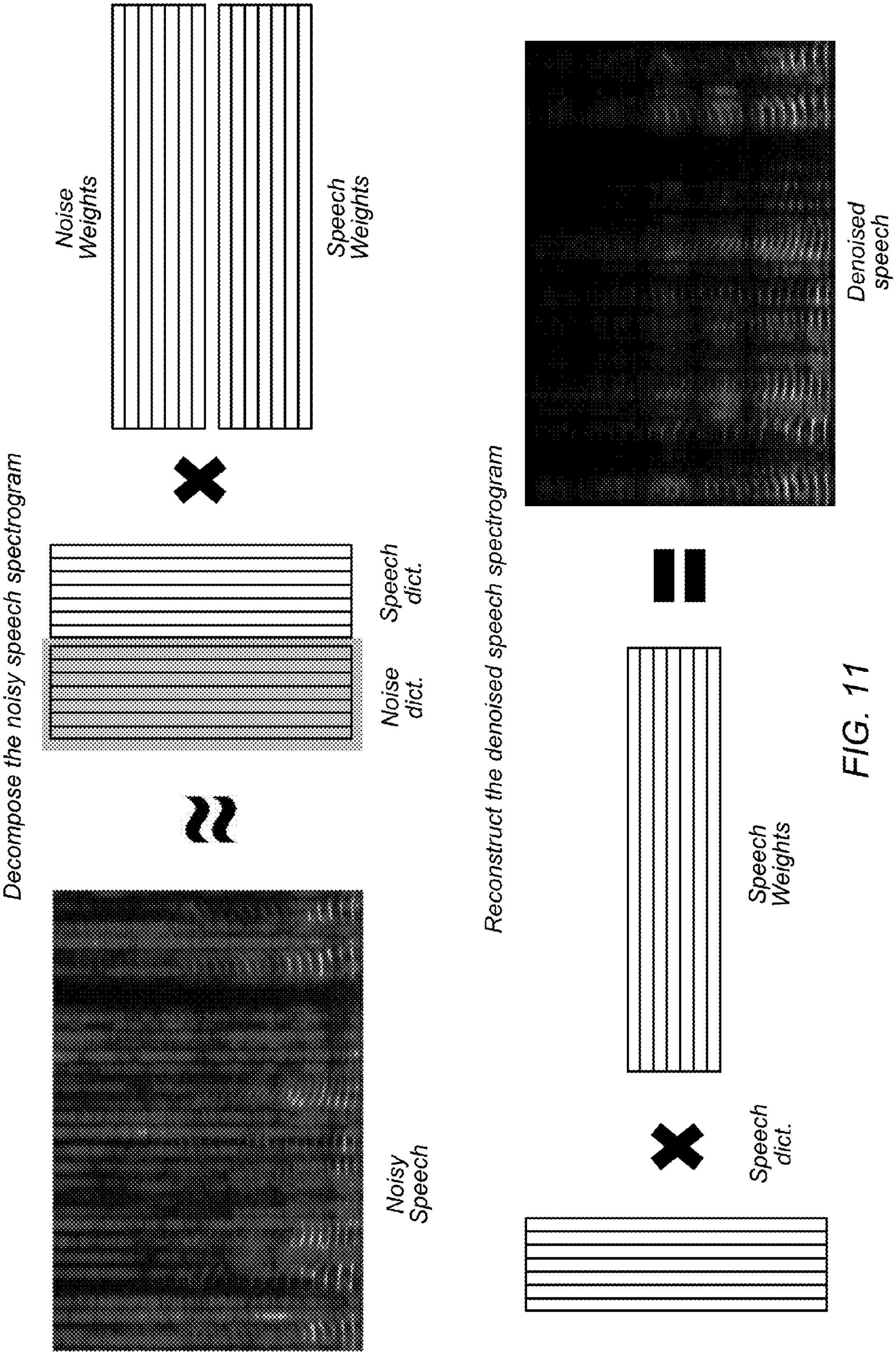
FIG. 11 illustrates an example of decomposing noisy speech and reconstructing denoised speech according to some embodiments.

FIG. 11 illustrates decomposing a noisy speech spectrogram and reconstructing the denoised speech spectrogram according to various embodiments. FIG. 11 illustrates that noisy speech, shown as a spectrogram, may approximate to combined noise and speech dictionaries multiplied by combined noise and speech weights. Moreover, the reconstructed speech, also shown as a spectrogram, may approximate to the speech dictionary multiplied by speech weights.

Figure 12A:
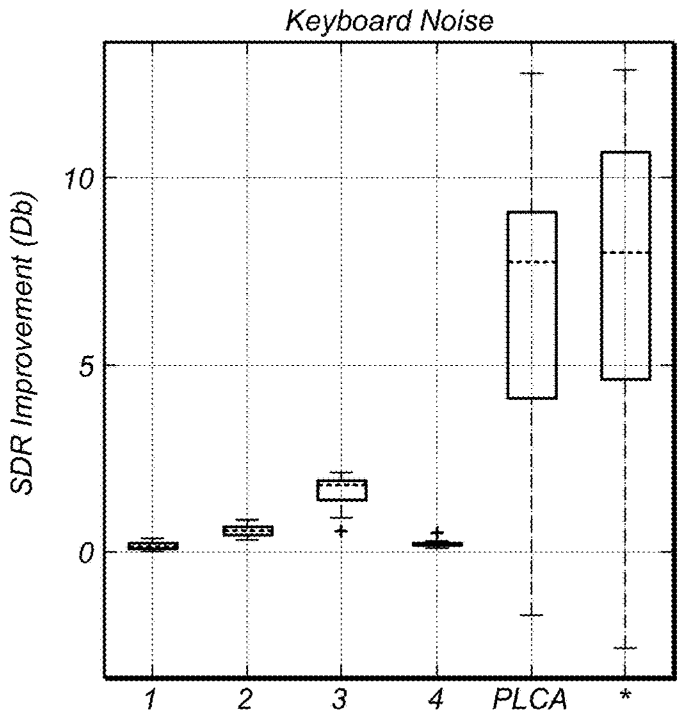
FIGS. 12A-15C illustrate comparisons between the described techniques and other denoising methods according to some embodiments.
Figure 12B:
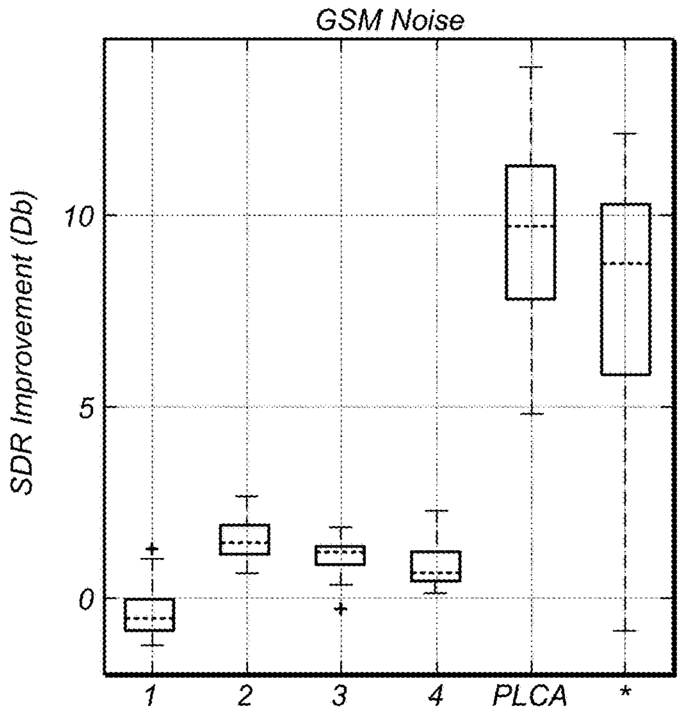

FIGS. 12A-15C illustrate comparisons between the method of FIG. 3 and other denoising methods according to some embodiments. In the illustrated comparison of FIGS. 12A-B, fourteen kinds of non-stationary noise were used: keyboard, GSM, ringtones, sirens, fireworks, machine-gun, motorcycles, train, helicopter, baby crying, cicadas, frogs, and a rooster. Six speakers were used for the speech portion of the signal, three of each gender. Five different signal-to-noise ratios (SNRs) were used: −10, −5, 0, 5, and 10 dB. The noisy speech database was generated from each combination of non-stationary noise, speech, and SNR. As illustrated in the examples of FIGS. 12A-B, which included noisy speech with keyboard and GSM noise, respectively, the method of FIG. 3 performed significantly better than other methods.

Figure 13:
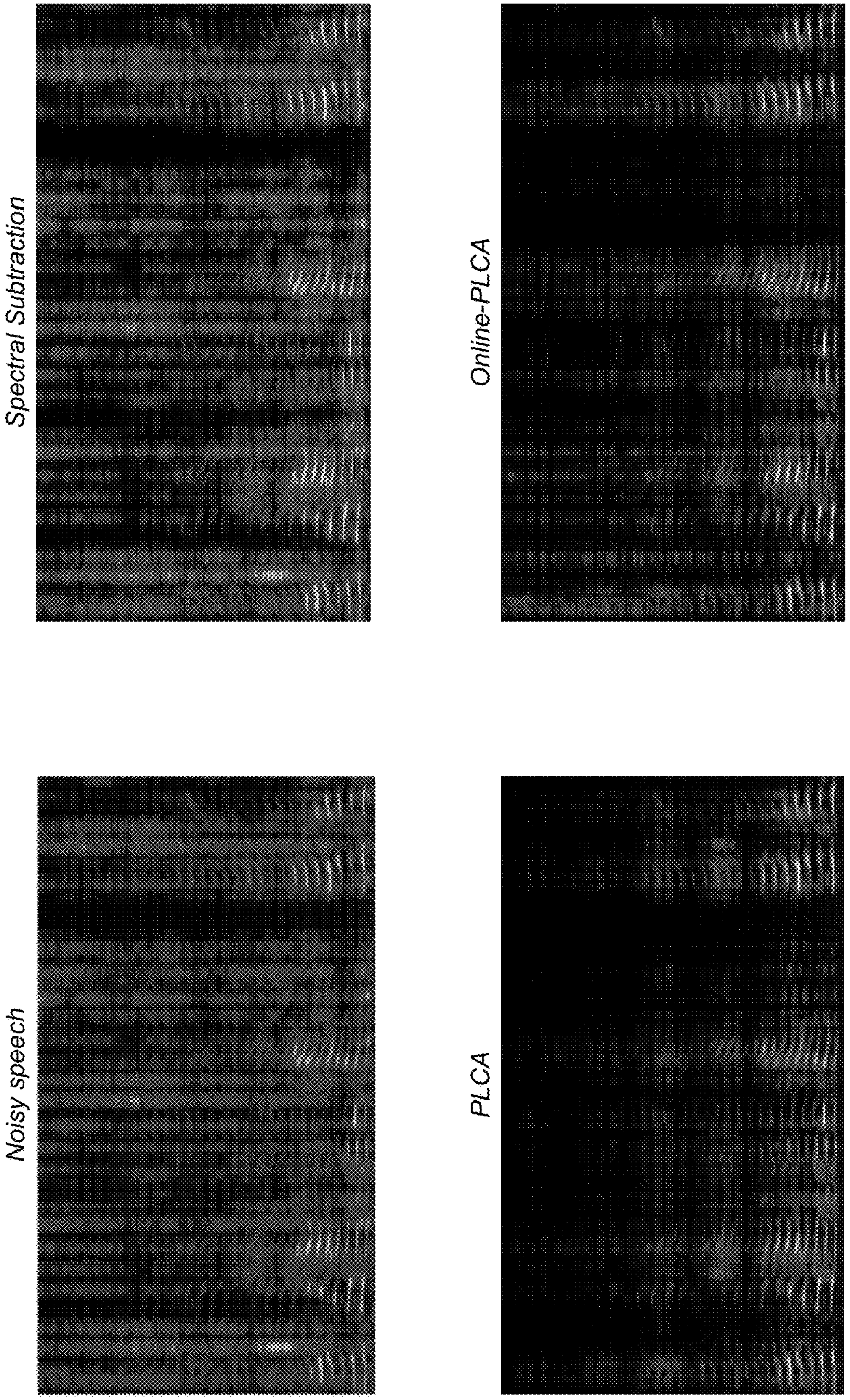
Figure 14:
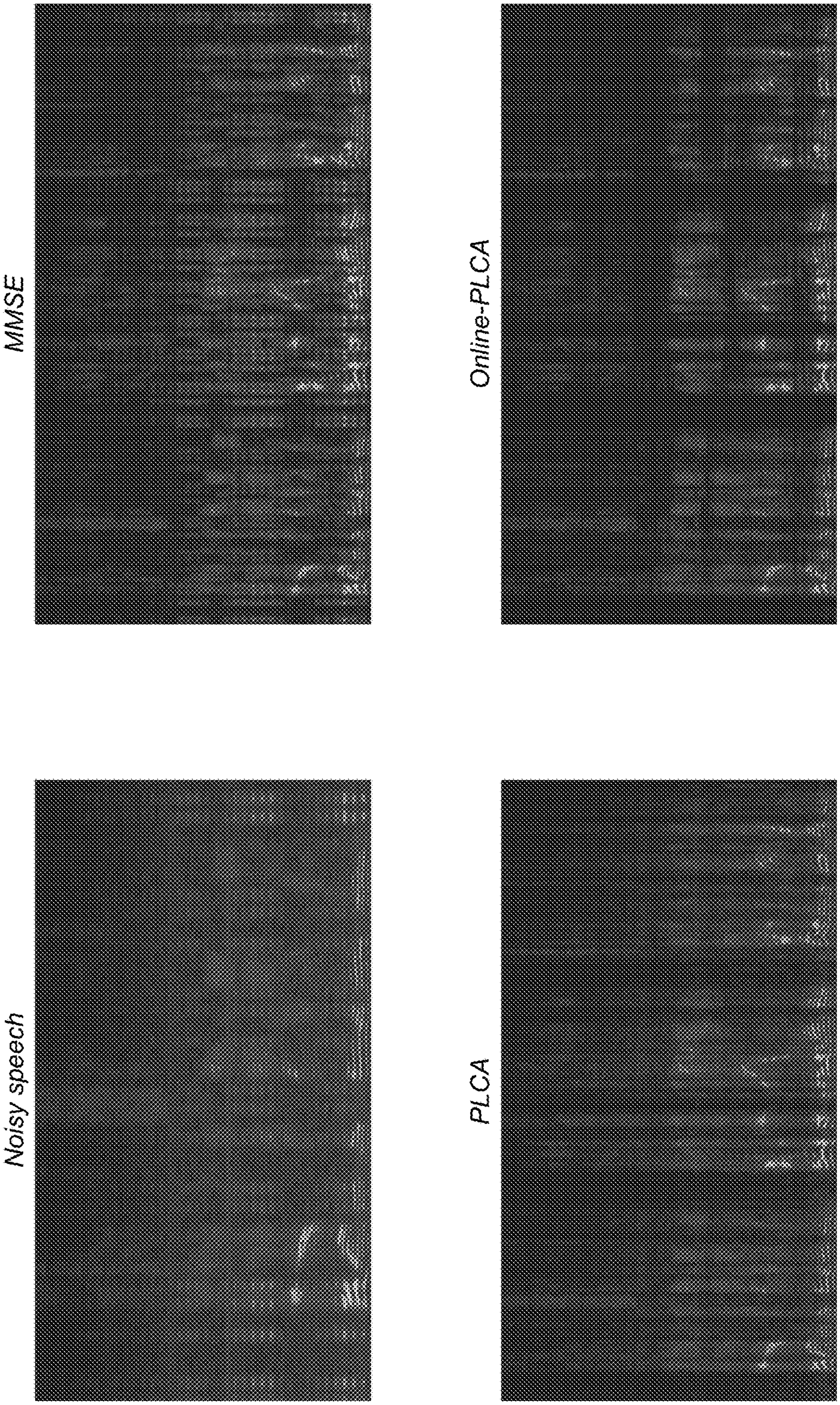

FIG. 13 illustrates spectrograms for noisy speech, spectral subtraction, PLCA, and online PLCA with the noise being keyboard noise. Note the much improved spectrogram in online PLCA indicating better noise removal. FIG. 14 illustrates spectrograms for noisy speech, MMSE, PLCA, and online PLCA with the noise being GSM noise. Once again, note the much improved spectrogram in the online PLCA indicating better noise removal.

Figure 15C:
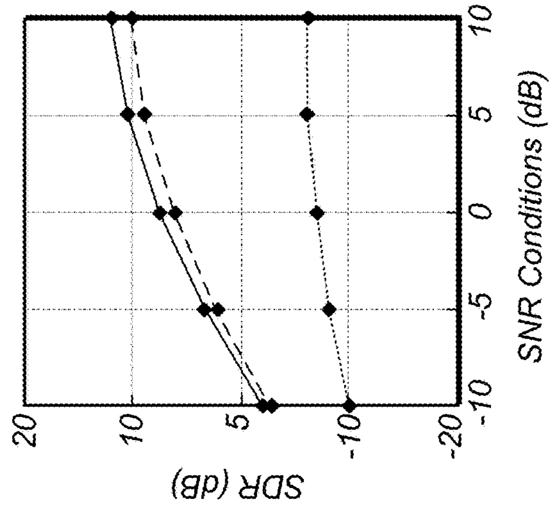
Figure 15B:
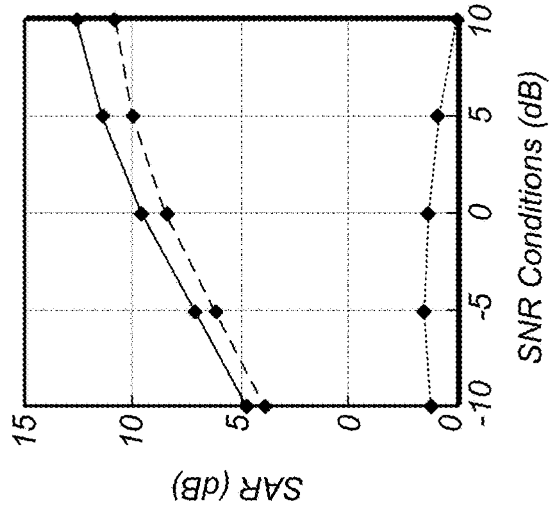
Figure 15A:
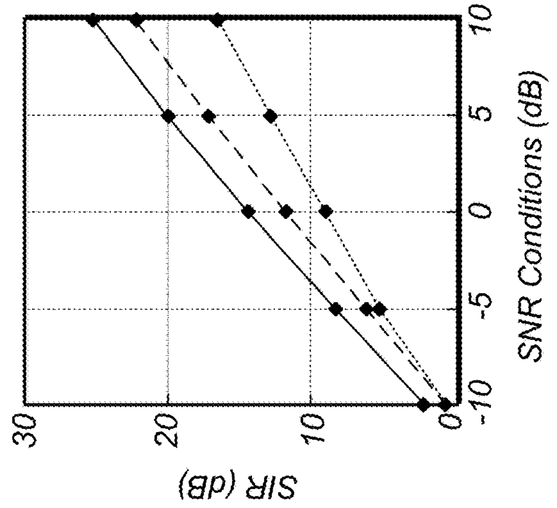

In the illustrated comparisons of FIGS. 15A-C, ten types of noise were used. Clean speech and clean noise files were used to construct a noisy speech data set. The clean speech files included thirty short English sentences (each about three seconds long) spoken by three female and three male speakers. The sentences from the same speaker were concatendated into one long sentence to obtain six long sentences, each about fifteen seconds long. The clean noise files included ten different types of noise: birds, casino, cicadas, computer keyboard, eating chips, frogs, jungle, machine guns, motorcycles, and ocean. Each noise file was at least one minute long. The first twenty seconds were used to learn the noise dictionary and the rest were used to construct the noisy speech files. Noisy speech files were generated by adding a clean speech file and a random portion of a clean noise file with one of the following SNRs: −10 dB, −5 dB, 0 dB, 5 dB, and 10 dB. By utilizing various combinations of speech, noise, and SNR, a total of 300 noisy speech files were used for the comparisons of FIGS. 15A-C, each about fifteen seconds long with a sampling rate of 16 kHz.

The noisy speech mixtures were segmented into frames 64 ms long with a 48 ms overlap. The speech dictionary was set to a size of 20. The noise dictionary varied based on the noise type but was from the set of {1, 2, 5, 10, 20, 50, 100, 200} and was chosen to optimize denoising in 0 dB SNR conditions. The number of EM iterations was set to 100. The disclosed technique is illustrated in the figures as the dashed line, offline semi-supervised PLCA as the solid line, and an online NMF ("O-IS-NMF") as the dotted line. For the disclosed technique, the buffer size L was set to 60, which is about one second long using these parameters. The speech dictionary used was much smaller size for the disclosed technique (7 as opposed to 20 for PLCA) because the speech dictionary in the disclosed technique is used to explain the speech spectra in the current frame and buffer frames. The tradeoff factor α used in the examples of FIGS. 15A-C was from the set {1, 2, . . . , 20}. Only 20 EM iterations were run in processing each frame.

FIG. 15A shows the average results over all noise types and speakers for each technique and SNR condition. Source-to-interference ratio (SIR) reflects noise suppression, source-to-artifacts ratio (SAR) reflects artifacts introduced during the separation process, and source-to-distortion ratio (SDR) reflects the overall separation performance. It can be seen that for all three metrics, the disclosed technique achieves nearly the same performance as the offline PLCA, while using a much smaller speech dictionary.

Table 1 presents the performances of PLCA and the disclosed technique for different noise types in the SNR condition of 0 dB. The noise-specific parameters for the two algorithms are also presented. It can be seen that for different noise types, the results vary. Note that for some noise types, like casino, computer keyboard, machine guns, and ocean, the disclosed technique performs similarly to offline PLCA.

TABLE 1

| | SIR | | SIR | | SIR | | | |
|---|---|---|---|---|---|---|---|---|
| Noise type | PLCA | Disclosed | PLCA | Disclosed | PLCA | Disclosed | $K_n$ | α |
| Birds | 20.0 | 18.4 | 10.7 | 8.9 | 10.1 | 8.3 | 20 | 14 |
| Casino | 5.3 | 7.5 | 8.6 | 7.2 | 3.2 | 3.9 | 10 | 13 |
| Cicadas | 29.9 | 18.1 | 14.8 | 10.5 | 14.7 | 9.7 | 200 | 12 |
| Keyboard | 18.5 | 12.2 | 8.9 | 10.2 | 8.3 | 7.9 | 20 | 3 |
| Chips | 14.0 | 13.3 | 8.9 | 7.0 | 7.3 | 5.7 | 20 | 13 |
| Frogs | 11.9 | 10.9 | 9.3 | 7.2 | 7.1 | 5.0 | 10 | 13 |
| Jungle | 8.5 | 5.3 | 5.6 | 7.0 | 3.2 | 2.5 | 20 | 8 |

TABLE 1-continued

| | SIR | | SIR | | SIR | | | |
|---|---|---|---|---|---|---|---|---|
| Noise type | PLCA | Disclosed | PLCA | Disclosed | PLCA | Disclosed | $K_n$ | α |
| Machine guns | 19.3 | 16.0 | 11.8 | 11.5 | 10.9 | 10.0 | 10 | 2 |
| Motorcycles | 10.2 | 8.0 | 7.9 | 7.0 | 5.6 | 4.5 | 10 | 10 |
| Ocean | 6.8 | 7.4 | 8.8 | 8.0 | 4.3 | 4.3 | 10 | 10 |

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A method, comprising:

receiving a mono channel signal including a sound mixture that includes first audio data from a first source and second audio data from a second source;

receiving pre-computed reference data corresponding to the first source; and performing online separation of the second audio data from the first audio data based on the pre-computed reference data.

2. The method of claim 1, wherein said performing online separation is performed in real-time.

3. The method of claim 1, wherein said performing online separation includes modeling the second audio data with a plurality of basis vectors.

4. The method of claim 1, wherein said performing online separation includes:

determining that a frame of the sound mixture includes audio data other than the first audio data; and separating the second audio data from the first audio data for the frame.

5. The method of claim 4, wherein said separating includes:

for the frame, determining spectral bases for the second source and determining a plurality of weights for each of the first and second sources; and updating a dictionary for the second source with the determined spectral bases and updating a set of weights with the determined plurality of weights for each of the first and second sources.

6. The method of claim 1, wherein said performing online separation includes:

determining that a frame of the sound mixture does not include second audio data; and bypassing updating a dictionary for the second source for the frame.

7. The method of claim 1, wherein said performing online separation is performed using probabilistic latent component analysis (PLCA).

8. The method of claim 1, further comprising reconstructing a signal that includes the second audio data based on said online separation.

9. The method of claim 1, wherein the pre-computed reference data includes a plurality of spectral basis vectors of the first source.

10. The method of claim 1, wherein the pre-computed reference data is computed from different audio data than the first audio data, wherein the different audio data is of a same source type as the first source.

11. The method of claim 1, wherein the sound mixture includes audio data from N sources including the first and second sources, further comprising:

receiving pre-computed reference data corresponding to each of the N sources other than the second source;

wherein said performing online separation further includes separating the second audio data from audio data from each of the other N−1 sources based on the pre-computed reference data corresponding to each of the other N−1 sources.

12. The method of claim 1, wherein the first audio data is a spectrogram of a signal from the first source, wherein each segment of the spectrogram is represented by a convex combination of spectral components of the pre-computed reference data.

13. The method of claim 1, wherein the first source is a non-stationary noise source.

14. A non-transitory computer-readable storage medium storing program instructions, wherein the program instructions are computer-executable to implement:

receiving a sound mixture that includes audio data from a plurality of sources including first audio data from a first source and other audio data from one or more other sources;

receiving a pre-computed dictionary corresponding to each source other than the first source; and performing online separation of the first audio data by separating the first audio data from each of the one or more other sources based on the pre-computed dictionaries.

15. The non-transitory computer-readable storage medium of claim 14, wherein said performing online separation is performed in real-time.

16. The non-transitory computer-readable storage medium of claim 14, wherein said performing online separation includes modeling the first audio data with a plurality of basis vectors.

17. The non-transitory computer-readable storage medium of claim 14, wherein to implement said performing online separation, the program instructions are further computer-executable to implement:

determining that a frame of the sound mixture includes the other audio data; and separating the first audio data from the other audio data for the frame.

18. The non-transitory computer-readable storage medium of claim 14, wherein to implement said separating, the program instructions are further computer-executable to implement:

for the frame, determining spectral bases for the first source and determining a plurality of weights for each of the first and one or more other sources; and updating a dictionary for the first source with the determined spectral bases and updating a set of weights with the determined plurality of weights for each of the first and one or more other sources.

19. The non-transitory computer-readable storage medium of claim 14, wherein to implement said performing online separation, the program instructions are further computer-executable to implement:

determining that a frame of the sound mixture does not include the first audio data; and bypassing updating a dictionary for the first source for the frame.

20. A system, comprising:

at least one processor; and a memory comprising program instructions, wherein the program instructions are executable by the at least one processors to:

receive a sound mixture comprising signals originated from a plurality of sources combined into a lesser number of channels, the sound mixture having first audio data from a first source and second audio data from a second source;

receive pre-computed reference data corresponding to the first source; and perform online separation of the second audio data from the first audio data based on the pre-computed reference data.

* * * * *